United States Patent
Thomas et al.

(10) Patent No.: US 9,620,298 B2
(45) Date of Patent: Apr. 11, 2017

(54) NANOFEATURED ELECTRODES AND ENERGY STORAGE COAXIAL CABLES THEREFROM

(71) Applicant: University of Central Florida Research Foundation, Inc., Orlando, FL (US)

(72) Inventors: Jayan Thomas, Orlando, FL (US); Zenan Yu, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 247 days.

(21) Appl. No.: 14/521,984

(22) Filed: Oct. 23, 2014

(65) Prior Publication Data

US 2015/0116908 A1    Apr. 30, 2015

Related U.S. Application Data

(60) Provisional application No. 61/895,738, filed on Oct. 25, 2013.

(51) Int. Cl.
| | |
|---|---|
| *H01G 11/46* | (2013.01) |
| *H01G 11/26* | (2013.01) |
| *H01G 11/24* | (2013.01) |

(52) U.S. Cl.
CPC ............ *H01G 11/46* (2013.01); *H01G 11/24* (2013.01); *H01G 11/26* (2013.01); *Y02E 60/13* (2013.01)

(58) Field of Classification Search
CPC ........ H01G 11/04; H01G 11/28; H01G 11/32; H01G 11/42
See application file for complete search history.

(56) References Cited

U.S. PATENT DOCUMENTS

| | | |
|---|---|---|
| 2003/0143453 A1 | 7/2003 | Ren et al. |
| 2010/0170691 A1 | 7/2010 | Abe et al. |
| (Continued) | | |

FOREIGN PATENT DOCUMENTS

| | | |
|---|---|---|
| WO | 2012145267 | 10/2012 |

OTHER PUBLICATIONS

Viet Thong Le, et al., "Coaxial Fiber Supercapacitor Using All-Carbon Material Electrodes", ACS Nano, 2013, 7 (7), pp. 5940-5947.

(Continued)

*Primary Examiner* — Nguyen Ha
(74) *Attorney, Agent, or Firm* — Jetter & Associates, P.A.

(57) ABSTRACT

A method of fabricating electrodes having protruding nanofeatures includes growing metal oxide nanofeatures on a metal or metal alloy wire using a heat treatment in an oxidizing environment. An electrically conducting material is deposited on the nanofeatures to form coated nanofeatures. An electrochemically active material (active material) is deposited to form a coating onto the coated nanofeatures to form at least one nanofeatured electrode. An energy storage coaxial cable (ESCC) can be formed from a first nanofeatured electrode and a second nanofeatured electrode, wherein the first nanofeatured electrode is configured as a linear electrode and the second nanofeatured electrode is configured as a tubular electrode, and the ESCC includes an ion porous separator and an electrolyte between the first nanofeatured electrode as an inner electrode and the second nanofeatured electrode as an outer electrode.

19 Claims, 4 Drawing Sheets

(56) References Cited

U.S. PATENT DOCUMENTS

| | | |
|---|---|---|
| 2010/0266897 A1 | 10/2010 | Lee et al. |
| 2012/0111730 A1* | 5/2012 | Choi .................. C25D 9/04 205/161 |
| 2013/0143414 A1 | 6/2013 | Thomas et al. |

OTHER PUBLICATIONS

Mildred S. Dresselhaus, et al., "Carbon Nanotubes Synthesis, Structure, Properties, and Applications" Topics in Applied Physics, vol. 80, published in 2001 by Springer-Verlag Berlin Heidelberg New York, pp. 1-447, specifically pp. 1 and 30 regarding CNTs.

* cited by examiner

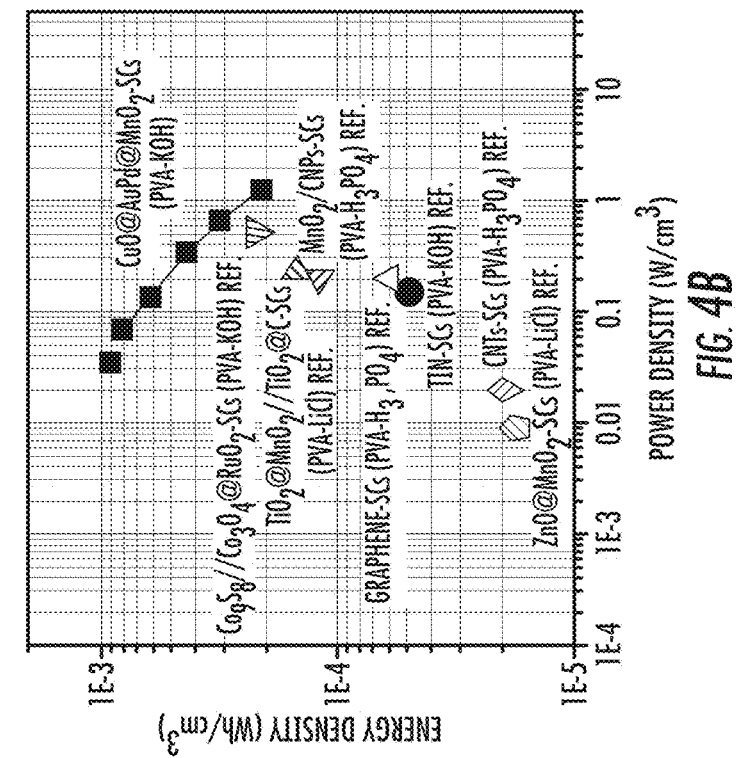
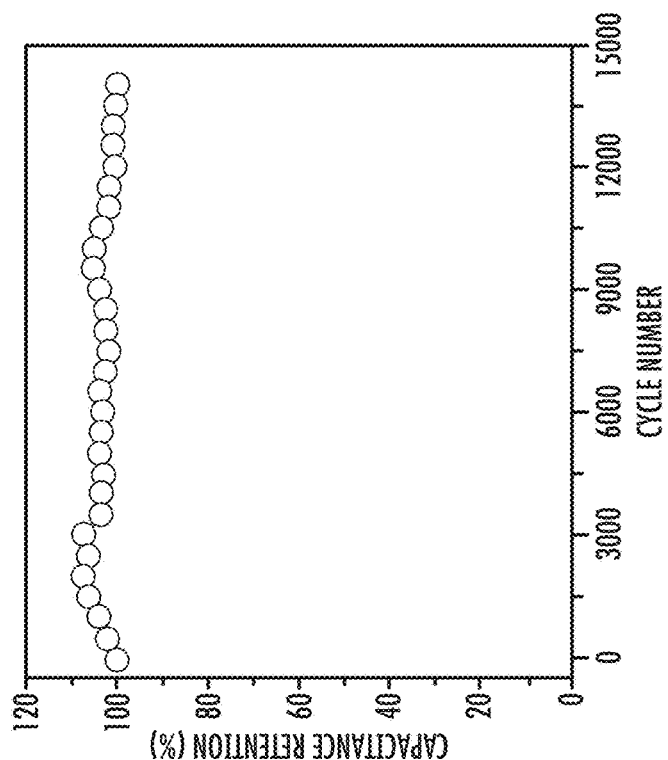
FIG. 4A
FIG. 4B

NANOFEATURED ELECTRODES AND ENERGY STORAGE COAXIAL CABLES THEREFROM

CROSS REFERENCE TO RELATED APPLICATIONS

This application claims the benefit of Provisional Application Ser. No. 61/895,738 entitled "NANOROD ELECTRODES AND ENERGY STORAGE COAXIAL CABLES THEREFROM", filed on Oct. 25, 2013, which is herein incorporated by reference in its entirety.

FIELD

Disclosed embodiments relate to electrodes, coaxial cables and supercapacitors.

BACKGROUND

Coaxial cable, also called coax, is one of the most common and basic cable arrangements used to carry electricity or signals. Coaxial cable has an inner electrical conductor covered by a layer of electronic insulator (dielectric), which is covered by an outer tubular electrically conducting shield.

One significant advantage of the coaxial design is that electric and magnetic fields are restricted inside the outer shield essentially without any leakage. In other words, external electric or magnetic fields are blocked from inducing interference to the signals propagating inside the cable. This peculiarity of coaxial cable makes it attractive for many applications such as electronic systems in aircraft and space stations, signal distribution of video or cable television, data connections of computers, etc. In one particular application, coaxial cable has been used as connector in a recent Robotic Refueling Mission (RRM) outside the international space station.

Supercapacitors, also known as electrochemical capacitors, have become popular energy storage devices in recent years. Compared to other energy storage devices such as batteries, supercapacitors have faster charge-discharge rates, higher power densities, and longer lifetimes. As a signature of their performance, safety, and reliability, supercapacitors have recently been employed in the emergency doors of Airbus A380. Manganese dioxide ($MnO_2$) has been used as a promising electrochemically active electrode material due to its outstanding characteristics such as high theoretical specific capacitance (~1,400 $F \cdot g^{-1}$), natural abundance, and environmental friendliness. However, the relatively poor electrical conductivity of $MnO_2$ has become the main bottleneck keeping supercapacitors with $MnO_2$ from achieving theoretical values.

SUMMARY

This Summary is provided to introduce a brief selection of disclosed concepts in a simplified form that are further described below in the Detailed Description including the drawings provided. This Summary is not intended to limit the claimed subject matter's scope.

Disclosed nanofeatured electrodes include an inner metal wire having metal oxide nanowiskers (NWs) protruding the metal or metal alloy wire, an electrically conducting material on the NWs to provide coated NWs, and an electrochemically active material layer on the coated NWs. As used herein, the term "nanofeature" refers to spaced apart protruding structures integrally formed from and extending outward from a metal or metal alloy wire core. The nanofeatures can comprise, but are not limited to, nanorods, nanowires, and other nanostructures. Also, as used herein, the term "electrochemically active material" is defined to mean a material having active sites for electrochemical/faradaic reactions.

Disclosed energy storage coaxial cables (ESCCs) include nanofeatured electrodes for at least one of its inner electrode and outer electrode, along with an ion porous separator and a generally solid electrolyte between the inner electrode and the outer electrode. In one embodiment the ion porous separator and solid electrolyte can be provided by same material/layer, such a porous polymer separator soaked into the electrolyte so that each side of the ion porous separator is coated with electrolyte. The ion porous separator and electrolyte may also be separate layers. The electrolyte can be a liquid provided a well-sealed system is provided. Disclosed ESCCs provide the feature of integrating a coaxial cable with an energy storage device into one unit providing the ability to both transmit electricity and store energy.

BRIEF DESCRIPTION OF THE DRAWINGS

Reference will now be made to the accompanying drawings, which are not necessarily drawn to scale, wherein:

FIG. 1A depicts steps in an example method of fabricating a disclosed nanofeatured electrode comprising a copper core having protruding CuO@AuPd@$MnO_2$ NWs thereon, where Y@X is used to indicate X is on Y, while

FIGS. 4A and 4B show cycle life and Ragone plot, with FIG. 4A showing cycle performance of a disclosed device at a scan rate of 1,000 $mV \cdot s^{-1}$ for 14,000 cycles, with FIG. 4B showing power and energy densities of a disclosed device.

DETAILED DESCRIPTION

Figure 1A:
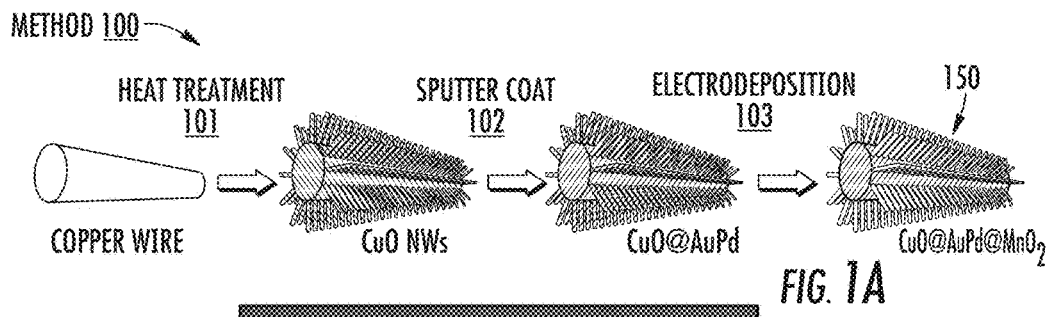

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Disclosed embodiments include methods of fabricating disclosed nanofeatured electrodes and ESCCs therefrom. To form disclosed nanofeatured electrodes, metal oxide nanofeatures are grown on a metal or metal alloy wire using a heat treatment in an oxidizing environment (e.g., air). An electrically conducting material layer is deposited on the nanofeatures to form metal coated nanofeatures. A layer of electrochemically active material, which can be a pseudo-capacitive or non-psuedocapacitive material, is deposited onto the coated nanofeatures. In some embodiments, the metal wire is a copper wire and the metal oxide is copper oxide, the depositing the electrically conducting material deposits a metal or metal alloy layer using sputtering. The layer of electrochemically active material is generally electrodeposited, typically a transition metal oxide, such as comprising $RuO_2$, $MnO_2$, $NiO$, or $Co_3O_4$.

FIG. 1A depicts steps in an example method 100 of fabricating a disclosed nanofeatured electrode shown comprising a copper core as a particular metal wire having protruding CuO@AuPd@$MnO_2$ NWs thereon for use as an inner electrode. Step 101 comprises growing metal oxide nanofeatures on a metal or metal alloy wire using a heat treatment in an oxidizing environment. Step 101 is shown in FIG. 1A as an oxidizing heat treatment of a copper wire which oxidizes the outer surface of the copper wire to form CuO NWs.

Step 102 comprises depositing an electrically conducting material on the nanofeatures to form coated nanofeatures. The coating can comprise a metal, metal alloy or other electrically conductive material such as conductive polymers that are generally conjugated polymers (e.g., a polythiophene), or graphite or similar materials. As used herein, an electrically conductive material provides an electrical conductivity of at least 10 $S \cdot m^{-1}$ at 20° C. Step 102 is shown in FIG. 1A as a sputter coating which deposits AuPd nanoparticles on the CuO NWs to form CuO@AuPd.

Step 103 comprises depositing an electrochemically active material (active material) coating onto the coated nanofeatures to form at least one nanofeatured electrode. Step 103 is shown in FIG. 1A as electrodeposition of $MnO_2$ as the electrochemically active material which completes the CuO@AuPd@$MnO_2$ nanofeatured electrode shown as 150.

To form a disclosed ESCC, a first nanofeatured electrode and a second nanofeatured electrode are provided, wherein the first nanofeatured electrode is configured as a linear electrode and the second nanofeatured electrode is configured as a tubular electrode. The ESCC can be assembled by adding an ion porous separator and an electrolyte between the first nanofeatured electrode as an inner electrode and the second nanofeatured electrode as an outer electrode (e.g., see FIG. 3A described below). As disclosed above, besides a solid electrolyte, the electrolyte may also comprise a liquid electrolyte provided a well-sealed system is provided.

In one particular embodiment generally described herein, large area, template-free, high aspect ratio, and freestanding nanofeatured electrode comprising a copper metal core with CuO@AuPd@$MnO_2$ core-shell nanofeatures protruding therefrom are synthesized which can be used for at least one of the inner conductor and the outer conductor of a disclosed ESCC, where the ESCC provides the functionality of both a coaxial cable and a supercapacitor (energy storage device). The inner conductor/electrode develops a thin layer of metal oxide (e.g., CuO) on the nanofeatures which acts as (i) an insulator (dielectric) layer to electrically separate the copper (or other metal or metal alloy) core and current collector of supercapacitor and acts as (ii) a nanostructured scaffold to deposit electrode materials. The integrated supercapacitor of the ESCC not only acts as an energy storage device, but also replaces the electrical insulator (dielectric) between the inner and outer electrical conductors.

The metal oxide (e.g., CuO) nanofeatures provides at least two advantages: (1) AuPd or any other electrically conducting layer (serves as current collector in supercapacitor) and the copper (or other) conductor is electrically insulated by the CuO nanofeatures, which prevents the electrical cable and supercapacitor from interfering with one another. In other words, if an electrochemically active material is directly deposited onto the conductors without this metal oxide nanofeatures (e.g., CuO), the function of coaxial cable cannot be performed because the electrons passing through will be trapped and consumed by electrochemical reactions. (2) The metal oxide nanofeatures serve as nanostructured scaffolding for depositing AuPd (or other metal) and $MnO_2$ (or other electrochemically active material) by turns, which provides an efficient strategy for overcoming the low electrical conductivity of a psuedocapacitive material such as $MnO_2$.

Such superior electrochemical performance of ESCC may be attributed to three factors. First, the surface area of each electrode is significantly enhanced by nanoarchitecturing, which provides much more electrochemically active sites for the reversible redox reactions. As described below relative to FIG. 1B, CuO NWs were vertical grown on the copper wire, which increases the surface area considerably compared to a smooth surface of copper wire. After depositing the electrochemically active material onto this nanostructure, more electrochemically active sites will be available during charging-discharging process compared to depositing onto a non-nanostructured surface, which results in substantial improvements of electrochemical properties. Second, the NW structure provides more open space, which increases the contact area to facilitate accessibility of electrolyte.

Figure 1B:
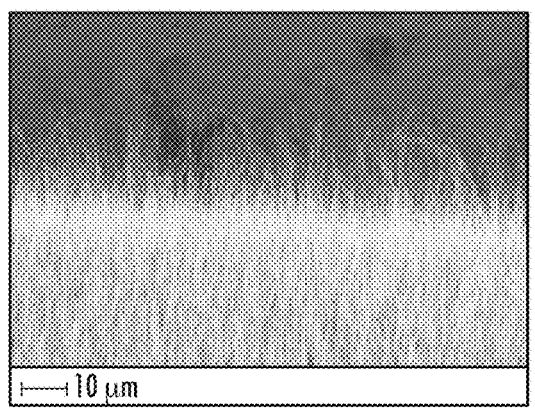
FIGS. 1B-D are scanned images of the structure following certain steps of the method, according to an example embodiment.
Figure 1C:
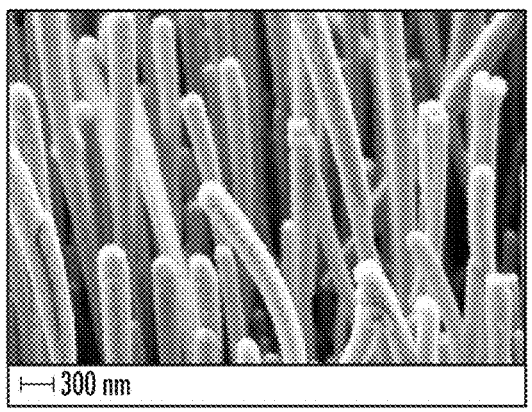
Figure 1D:
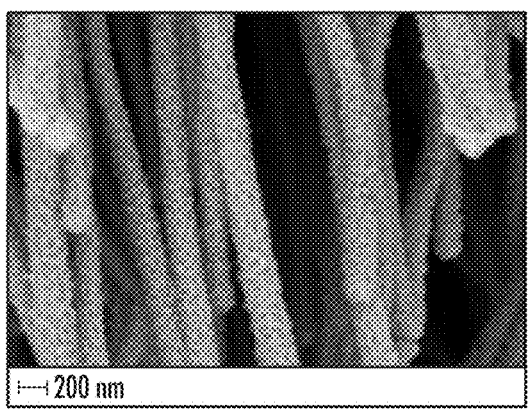

As described below relative to FIG. 1D, $MnO_2$ was conformally coated onto NWs and each NW is standing separated, without touching one another, which enables the electrolyte to access the $MnO_2$ from the bottom site of each NW. Third, the internal resistance is sharply reduced by the large and binder-free contact area between AuPd and $MnO_2$. When depositing $MnO_2$ onto a non-nanostructured surface, the condensed packing of $MnO_2$ blocks electrons from reaching the first layer of $MnO_2$, whereas the electron transportation path is significantly shortened through the use of a nanostructured design.

In summary, disclosed integrated ESCCs simultaneously serve as an energy storage device as well as a coaxial cable. In the particular embodiment tested, CuO@AuPd@$MnO_2$ core-shell NWs as the electrode of the energy storage part of ESCC was found to exhibit excellent electrochemical properties, in which case a specific capacitance of 1,376 $F \cdot g^{-1}$ was provided at a scan rate of 5 $mV \cdot s^{-1}$. Moreover, supercapacitor device based on CuO@AuPd@$MnO_2$ NWs were found to show extraordinary flexibility and bendability, 99.6% capacitance retention (even after 14,000 cycles), and high power and energy densities (0.55 $mWh \cdot cm^{-3}$ and 413 $mW \cdot cm^{-3}$). Aside from its electrochemical performance, the coaxial supercapacitor acts as an electrical insulator between inner and outer cupric conductor. Together, these properties integrate a supercapacitor and coaxial cable into one unit. All of these results demonstrate disclosed ESCC's are a good candidates for future energy storage systems as well as electrical or signal connectors, or for applications where electrical conduction and energy storage are both desired.

EXAMPLES

Disclosed embodiments are further illustrated by the following specific Examples, which should not be construed as limiting the scope or content of this Disclosure in any way.

Corresponding to step 101 shown in FIG. 1A, CuO NWs were grown on copper wire/foil by a heat treatment in air (e.g., see Jiang, X., Herricks, T. & Xia, Y. which discloses Cuo nanowires can be synthesized by heating copper substrates in air Nano Lett. 2, 1333-1338 (2002)). A pure copper wire/foil was then cleaned in an acetone solution for 1 min, followed by washing with distilled (DI) water twice and drying by a nitrogen gas flow. The copper wire/foil was then placed in an alumina crucible (MTI Corporation, CA) and rapidly heated to 500° C. at a heating rate of 20° C.·min$^{-1}$ in a Muffle furnace and kept for 4 h. A scanned scanning electron microscopy (SEM) image revealed the copper wire was fully covered by protruding CuO NWs having a diameter of about 0.37 mm. FIG. 1B is a close-up view of the scanned SEM image showing vertically grown CuO NWs. The average lengths of CuO NWs are ~15 μm or more and the diameter is ~200 nm. These dimensions can be varied depending on the preparation conditions.

Prior to depositing electrochemically active material, corresponding to step 102 shown in FIG. 1A, a thin layer of gold-palladium (AuPd; 60% Au: 40% Pd) was coated onto the CuO NWs to serve as a current collector as well as an anode for electrodeposition of electrochemically active material. Other metals such as aluminum, copper or other metals, or as describe above other electrically conducting materials can be used, to provide the same function as AuPd. After the heat treatment, the sample was placed in a sputter coater (EMITECH K550) for metal deposition at a constant current of 40 mA for 20 min. The target used for sputtering was composed of 60% Au and 40% Pd. $MnO_2$ active layer was deposited onto the conducting AuPd metal layer using an anodic electrodeposition method at constant current of 0.5 mA·cm$^{-2}$ for 3 to 48 min. FIG. 1C is a scanned SEM image of AuPd nanoparticles that were conformally sputter-coated onto each of the NWs. The surface of the CuO NWs can be seen to be much grainier after deposition of AuPd, which increases the surface area considerably.

The electrolyte for the electrodeposition of the electrochemically active material corresponding to step 103 shown in FIG. 1A was prepared by mixing 0.01 M manganese acetate ($MnAc_2$) and 0.02 M ammonium acetate ($NH_4Ac$) in a solvent containing 90 v/v % of DI water and 10 v/v % of dimethyl sulfoxide (DMSO). FIG. 1D is a scanned SEM image of $MnO_2$ coated nanofeatures that were formed by uniformly electrodepositing $MnO_2$ onto the NWs. The $MnO_2$ coated nanofeatures can be seen to be conformally deposited onto these NWs. The chemical composition of as-electrodeposited $MnO_2$ was analyzed using X-ray photoelectron spectroscope (XPS) and only two peaks corresponding to $Mn^{4+}$ oxidation state were found, indicating $Mn^{4+}$ ions are the main component of product from electrodeposition.

A similar fabrication technique as described above relative to method 100 shown in FIG. 1A was used to make nanowhiskers on a flexible copper foil and make it into a tubular form to serve as the outer electrode for a disclosed ESCC. A SEM performed revealed the thickness of the outer electrode to be ~30 μm and vertical grown NWs on the inner side of the electrode.

To complete fabrication of the ESCC, the solid electrolyte was prepared by dissolving 5.6 g KOH and 10 g PVA in 100 mL DI water. The whole mixture was heated at 90° C. under stirring until all the solute completely dissolved in solvent. An ion porous separator (Celgard 3501, NC, 25 μm) was soaked into the electrolyte so that each side of the separator was fully coated with electrolyte. An inner linear electrode was then wrapped by this separator tightly and completely. An outer tubular electrode was then wrapped onto the separator and an ESCC was made after the PVA-KOH gel solidified which provided a protective outer plastic tube for the ESCC.

Regarding characterization and measurements, Surface morphologies were characterized using a scanning electron microscopy (SEM, ZEISS Ultra 55). To investigate the chemical compositions of sample surface, X-ray photoelectron spectroscopy (XPS, PHI 5400) was performed. To compare the electrochemical performance of different materials, a three-electrode system was conducted involving a working electrode (electrode prepared based on the materials as-synthesized), a platinum counter electrode and a saturated calomel electrode (SCE) as reference electrode. Cyclic voltammetry (CV) and GCD were performed using this three-electrode configuration in 1M KOH solution on an electrochemical workstation (Bio-Logic, SP-150). The characterization experiments of the devices using solid electrolyte were conducted by a two-electrode system in air with a voltage range of 0 to 0.8 V.

Figure 2A:
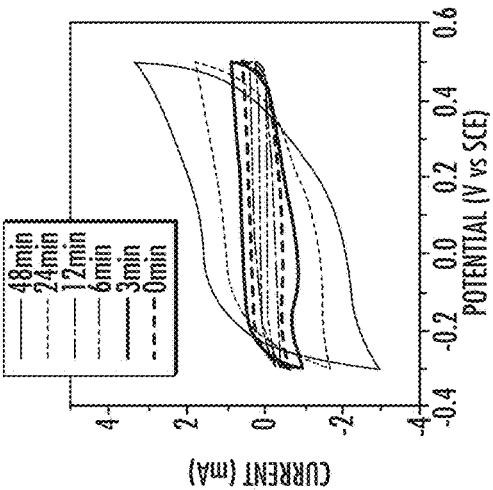
FIGS. 2A-F show the electrochemical performance of disclosed CuO@AuPd@$MnO_2$ NWs.
Figure 2B:
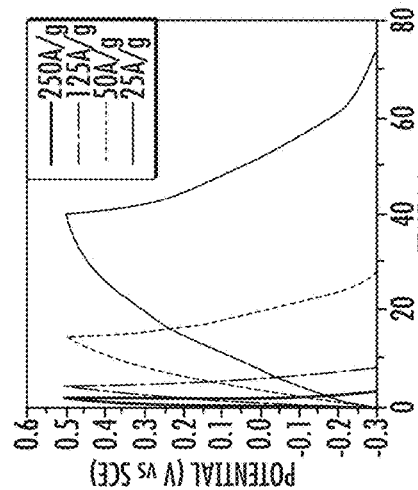
Figure 2C:
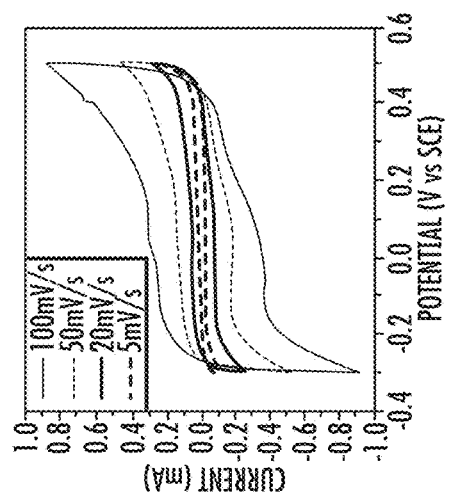
Figure 2D:
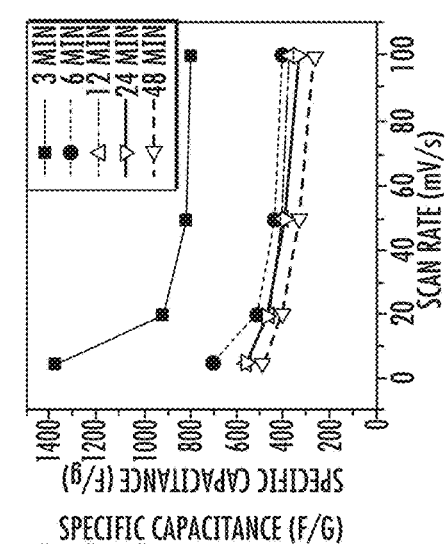
Figure 2E:
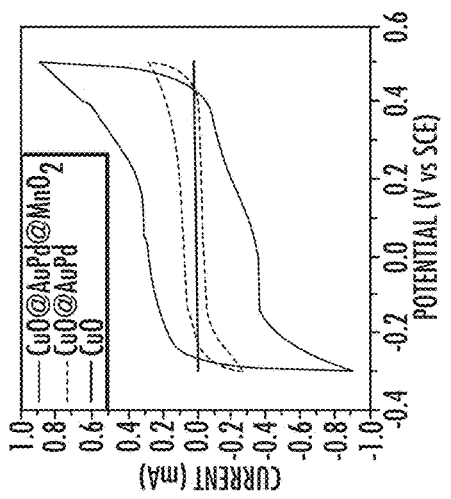
Figure 2F:
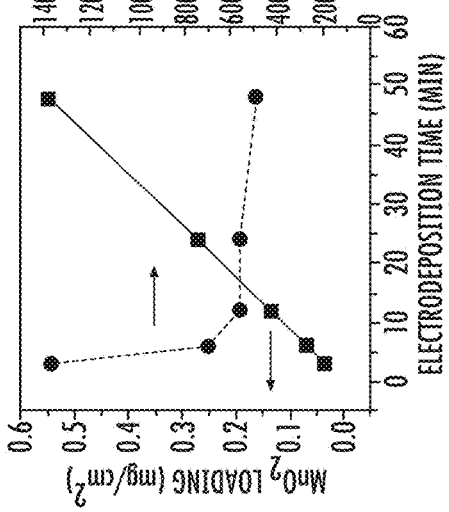

FIGS. 2A-F show the electrochemical performance of disclosed CuO@AuPd@$MnO_2$ NWs. FIG. 2A are cyclic voltammetry (CV) curves of CuO@AuPd@$MnO_2$ NWs were compared to pure CuO NWs and CuO@AuPd NWs at a scan rate of 100 mV·s$^{-1}$ in 1M aqueous KOH electrolyte. FIG. 2B are CV curves of CuO@AuPd@$MnO_2$ NWs at different scan rates (5 to 100 mV·s$^{-1}$). FIG. 2C are CV curves of CuO@AuPd@$MnO_2$ NWs at a scan rate of 100 mV·s$^{-1}$ with different $MnO_2$ deposition time of 0, 3, 6, 12, 24, and 48 min, respectively. FIG. 2D shows $MnO_2$ loading and specific capacitance at a scan rate of 5 mV·s$^{-1}$ of CuO@AuPd@$MnO_2$ NWs as a function of electrodeposition time. FIG. 2E shows specific capacitance of CuO@AuPd@$MnO_2$ NWs at different $MnO_2$ electrodeposition times as a function of scan rate. FIG. 2F are GCD curves of CuO@AuPd@$MnO_2$ NWs at different current densities (25 to 250 A·g$^{-1}$).

To evaluate the electrochemical properties of disclosed CuO@AuPd@$MnO_2$ NWs, cyclic voltammetry (CV) measurements were performed using a three-electrode system in 1M KOH solution. In comparison, pure CuO NWs and CuO@AuPd NWs were also studied in CV measurements. The CV curve of CuO@AuPd@$MnO_2$ NWs has much higher current compared to pure CuO and CuO@AuPd NWs, revealing CuO@AuPd@$MnO_2$ has the best supercapacitive behavior (see FIG. 2A). CV curves of CuO@AuPd@$MnO_2$ NWs at different scan rates ranging from 5 to 100 mV·s$^{-1}$ were also performed and shown in FIG. 2B. All the CV curves are close to symmetrical rectangle-like shape, indicating the good electrochemical performance of CuO@AuPd@$MnO_2$ NWs. Different mass loading of $MnO_2$ were also studied by varying the deposition time ranging from 3 to 48 min. All the CV curves of different deposition time show good rectangularity (see FIG. 2C), evidencing good capacitive behavior of the electrodes.

The specific capacitance for 3, 6, 12, 24, 48 min deposition of $MnO_2$ was 1,376, 702, 562, 561, and 493 $F \cdot g^{-1}$, respectively, at a scan rate of 5 $mV \cdot s^{-1}$ (FIG. 2D). The highest specific capacitance of 1,376 $F \cdot g^{-1}$ was obtained by a 3 min deposition of $MnO_2$ (0.04 $mg \cdot cm^{-2}$). This value is much higher than other $MnO_2$ based nanostructures, such as $SnO_2$@$MnO_2$ nanowires (637 $F \cdot g^{-1}$ at 2 $mV \cdot s^{-1}$, 0.08 $mg \cdot cm^{-2}$)[12], AuPd@$MnO_2$ nanopillars (603 $F \cdot g^{-1}$ at 5 $mV \cdot s^{-1}$, 0.01 $mg \cdot cm^{-2}$)[11], $WO_{3-x}$@Au@$MnO_2$ nanowires (588 $F \cdot g^{-1}$ at 10 $mV \cdot s^{-1}$, 0.04 $mg \cdot cm^{-2}$)[13], TiN/$MnO_2$ nanotubes (486 $F \cdot g^{-1}$ at 2 $mV \cdot s^{-1}$, 0.06 mg $cm^{-2}$)[14], C@$MnO_2$ nanorods (302 $F \cdot g^{-1}$ at 5 mV/s, 0.072 $mg \cdot cm^{-2}$)[15], and $Zn_2SnO_4$@$MnO_2$ nanorods (621.6 $F \cdot g^{-1}$ at 2 $mV \cdot s^{-1}$)[16]. In addition, the specific capacitance of our electrode still remained at 493 F $g^{-1}$ even at a higher loading mass of $MnO_2$ (0.55 $mg \cdot cm^{-2}$). The specific capacitance of electrodes with a deposition time of 3 min show a consistent enhancement of up to 2 times than those with longer deposition times by varying different scan rate ranging from 5 to 100 $mV \cdot s^{-1}$ (FIG. 2E). This implies that the elongating deposition times may lead to an increase in thickness of the electrochemically active material, but only a thin (outer) layer is being charged and discharged.

To further evaluate the charge-discharge storage capacity of disclosed electrodes, galvanostatic charge-discharge (GCD) measurements were performed using the same three-electrode configuration system as the CV measurements. GCD curves of the CuO@AuPd@$MnO_2$ NWs at different current densities (25 to 250 $A \cdot g^{-1}$) show linear and symmetrical charge and discharge profiles (See FIG. 2F), indicating good supercapacitive behavior of these NWs. Different deposition times of $MnO_2$ were also studied by GCD. The specific capacitance achieved by depositing $MnO_2$ for 3, 6, 12, 24, 48 min at a current density of 1 $mA \cdot cm^{-2}$ is 857, 564, 556, 542, 498 $F \cdot g^{-1}$, respectively. The specific capacitance obtained at a 3 min deposition time is much higher than those obtained from longer deposition which is in accordance with the result from CV measurements.

Figure 3A:
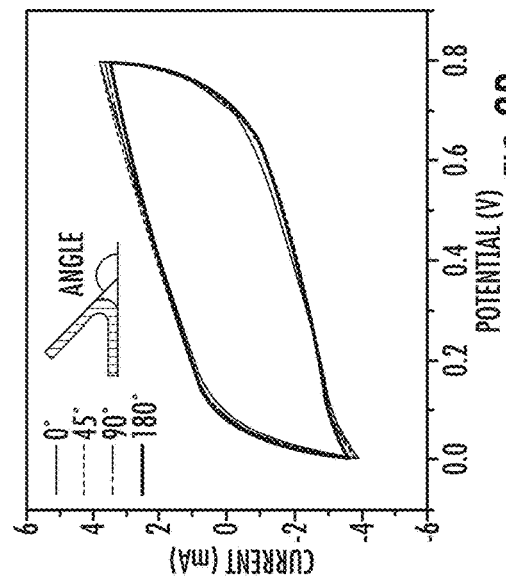
FIG. 3A is a cut-open schematic diagram of a disclosed ESCC including a solid electrolyte.

Regarding fabrication and characterizations of ESCCs, an ESCC can be fabricated by placing the outer tubular electrode onto the inner liner electrode where the two electrodes are separated by a separator layer that is ion porous and by a solid electrolyte. FIG. 3A is a cut-open schematic diagram of a disclosed ESCC 300 with its cable form including a first nanofeatured electrode 310 configured as an inner linear electrode and a second nanofeatured electrode 320 configured as an outer tubular electrode. The ESCC 300 includes an ion porous separator 325 and a solid electrolyte 330 between the first nanofeatured electrode 310 and the second nanofeatured electrode 320. The solid electrolyte 330 shown in FIG. 3A generally substantially fills the volume between the inner linear electrode 310 and the outer tubular electrode 320 that is not occupied by the separator. A plastic jacket 340 shown provides encapsulation for environmental protection for the ESCC 300.

Figure 3B:
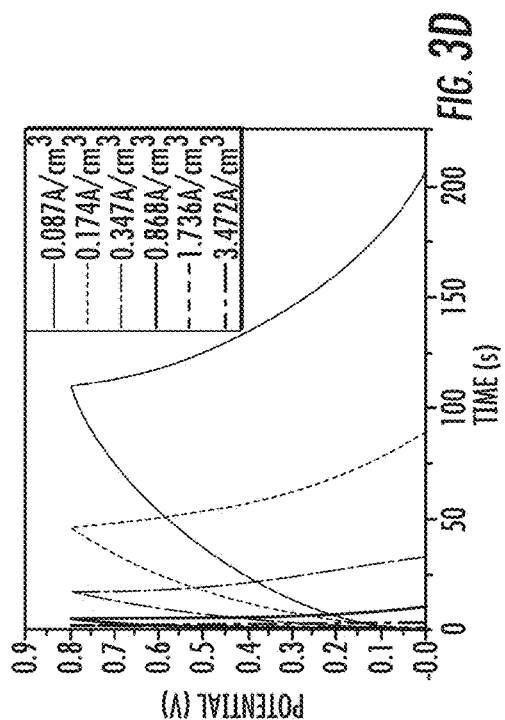
FIG. 3B shows subtle changes of CV curves collected at a scan rate of 100 $mV \cdot s^{-1}$ under different bending angles ranging from 0 to 180° are shown.
Figure 3C:
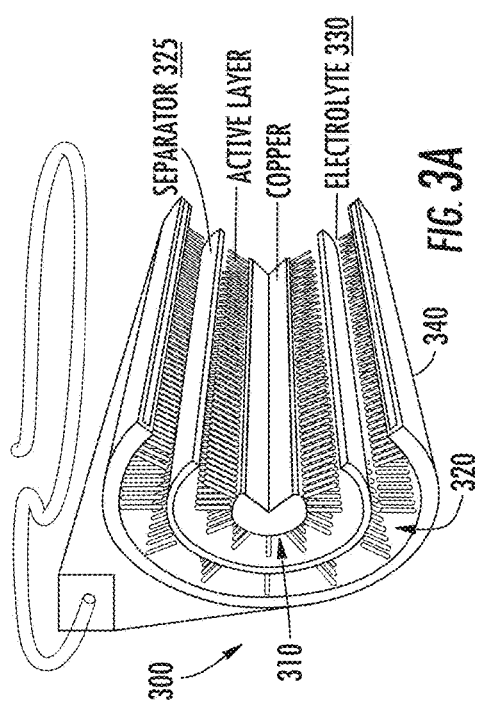
FIG. 3C shows bending the device up to 100 times at different bending angles evidenced excellent bendability.
Figure 3D:
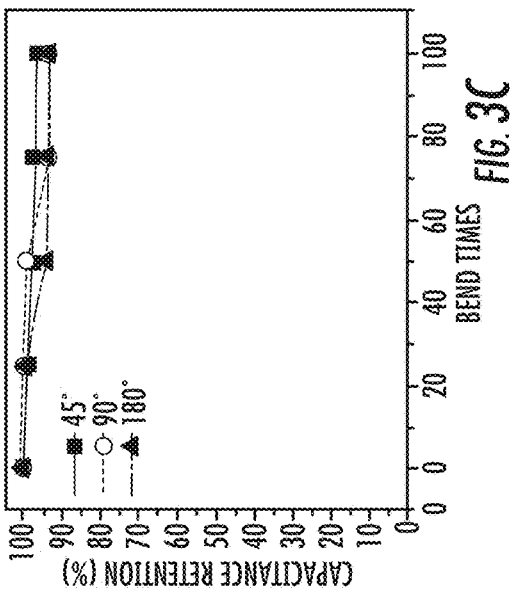
FIG. 3D shows galvanostatic charge-discharge (GCD) curves of a disclosed device at different current densities.

FIGS. 3B-D show electrochemical performance data for a disclosed ESCC. CV measurements were performed to examine the flexibility and bendability of the ESCC. In FIG. 3B subtle changes of CV curves collected at a scan rate of 100 $mV \cdot s^{-1}$ under different bending angles ranging from 0° to 180° are shown. The shapes of all four CV curves are almost identical to one another, indicating the good flexibility of the device. Moreover, the rectangular and symmetrical shape of the CV curves exhibits essentially ideal pseudocapacitive nature of $MnO_2$ and superior reversible redox reaction.

A bend time test of disclosed devices was also carried out by folding the device at different angles up to 100 times. The supercapacitor device still remains at 93.4% of its initial capacitance even folded at 180 degree for 100 times (FIG. 3C), revealing the excellent bendability of the device.

To further evaluate the electrochemical performance of disclosed ESCC devices, GCD measurements were performed. FIG. 3D shows GCD curves at various current densities ranging from 0.087 to 3.472 $A \cdot cm^{-3}$. The charge-discharge curves are symmetric and linear in nature, which further confirms good electrochemical capacitive characteristics and fast charging-discharging process characteristics of disclosed ESCCs.

Long cycle life and high power and energy densities of disclosed ESCCs were demonstrated. Good cycling performance is one of the most vital characteristics for energy storage devices. FIG. 4A shows the long-term cycle stability. The capacitance remains at 99.6% of its initial value after 14,000 cycles, revealing excellent cycle stability of a disclosed ESCC. Energy density and power density are another two important parameters to characterize the performance of energy storage devices.

FIG. 4B presents the volumetric power and energy densities of a disclosed solid electrolyte based ESCC. The average volumetric energy density is 0.55 $mWh \cdot cm^{-3}$ with a volumetric power density of 413 $mW \cdot cm^{-3}$. These results are substantially higher than those of recently reported all-solid-state supercapacitors (SCs), such as ZnO@$MnO_2$—SCs (0.018 $mWh \cdot cm^{-3}$ and 9 $mW \cdot cm^{-3}$, PVA-LiCl), carbon nanotube SCs (CNT-SCs, 0.02 $mWh \cdot cm^{-3}$ and 20 $mW \cdot cm^{-3}$, PVA-$H_3PO_4$), TiN SCs (0.05 $mWh \cdot cm^{-3}$ and 150 $mW \cdot cm^{-3}$, PVA-KOH), Graphene-SCs (0.06 $mWh \cdot cm^{-3}$ and 200 $mWh \cdot cm^{-3}$, PVA-$H_3PO_4$), $MnO_2$/carbon-nanoparticles SCs ($MnO_2$/CNPs-SCs, 0.12 $mWh \cdot cm^{-3}$ and 200 $mWh \cdot cm^3$, PVA-$H_3PO_4$), $TiO_2$@$MnO_2$ and $TiO_2$@C asymmetric SCs ($TiO_2$@$MnO_2$/$TiO_2$@C—SCs, 0.15 $mWh \cdot cm^{-3}$ and 230 $mWh \cdot cm^3$, PVA-LiCl), and ($Co_9S_8$/$Co_3O_4$@$RuO_2$—SCs, 0.22 $mWh \cdot cm^{-3}$ and 520 $mWh \cdot cm^3$, PVA-KOH).

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The invention claimed is:
1. A method of fabricating electrodes having protruding nanofeatures, comprising:
   growing metal oxide nanofeatures on a metal or metal alloy wire using a heat treatment in an oxidizing environment;
   depositing an electrically conducting material on said nanofeatures to form coated nanofeatures, and
   depositing an electrochemically active material (active material) coating onto said coated nanofeatures to form at least one nanofeatured electrode.

2. The method of claim 1, wherein said metal or metal alloy wire comprises a copper wire, said metal oxide is copper oxide, said depositing said electrically conducting material comprises sputtering, and wherein said depositing said nanofeatures of said active material comprises electrodepositing.

3. The method of claim 1, wherein said active material comprises $MnO_2$.

4. The method of claim 1, wherein said at least one nanofeatured electrode comprises a first nanofeatured electrode and a second nanofeatured electrode, wherein said first nanofeatured electrode is configured as a linear electrode and said second nanofeatured electrode is configured as a tubular electrode, and
assembling an electrode energy storage coaxial cable (ESCC) by adding an ion porous separator and an electrolyte between said first nanofeatured electrode positioned as an inner electrode for said ESCC and said second nanofeatured electrode positioned as an outer electrode for said ESCC.

5. The method of claim 4, further comprising forming an outer plastic jacket after said assembling that provides encapsulation for said ESCC.

6. The method of claim 4, wherein said electrolyte comprises a solid electrolyte.

7. The method of claim 4, wherein said electrolyte comprises a liquid electrolyte.

8. The method of claim 1, wherein said electrically conducting material comprises a metal or a metal alloy.

9. A nanofeatured electrode, comprising:
an inner metal or metal alloy wire having metal oxide nanowiskers (NWs) protruding from said metal or metal alloy wire;
an electrically conducting material on said NWs, and
an electrochemically active material (active material) coating on said electrically conducting material.

10. The nanofeatured electrode of claim 9, wherein said metal or metal alloy wire comprises a copper wire and said metal oxide is copper oxide.

11. The nanofeatured electrode of claim 9, wherein said active material comprises $MnO_2$.

12. The nanofeatured electrode of claim 9, wherein said electrically conducting material comprises a metal or a metal alloy.

13. An energy storage coaxial cable (ESCC), comprising:
a first nanofeatured electrode; and
a second nanofeatured electrode;
wherein said first nanofeatured electrode is configured as a linear electrode and said second nanofeatured electrode is configured as a tubular electrode, each said first and said second nanofeatured electrode comprising:
an inner metal or metal alloy wire having metal oxide nanowiskers (NWs) protruding from said metal or metal alloy wire;
an electrically conducting material on said NWs;
an electrochemically active material (active material) coating on said electrically conducting material, and
an ion porous separator and an electrolyte between said first nanofeatured electrode positioned as an inner electrode for said ESCC and said second nanofeatured electrode positioned as an outer electrode for said ESCC.

14. The ESCC of claim 13, wherein said metal or metal alloy wire comprises a copper wire and said metal oxide is copper oxide.

15. The ESCC of claim 13, wherein said active material comprises $MnO_2$.

16. The ESCC of claim 13, further comprising an outer plastic jacket that provides encapsulation for said ESCC.

17. The ESCC of claim 13, wherein said electrolyte comprises a solid electrolyte.

18. The ESCC of claim 13, wherein said electrolyte comprises a liquid electrolyte.

19. The ESCC of claim 13, wherein said electrically conducting material comprises a metal or a metal alloy.

* * * * *